United States Patent
Kuerbitz

(10) Patent No.: US 7,443,494 B1
(45) Date of Patent: Oct. 28, 2008

(54) APPARATUS AND METHOD FOR DETECTING OPTICAL SYSTEMS IN A TERRAIN

(75) Inventor: Gunther Kuerbitz, Koenigsbronn (DE)

(73) Assignee: Carl Zeiss Optronics GmbH, Oberkochen (DE)

( * ) Notice: Subject to any disclaimer, the term of this patent is extended or adjusted under 35 U.S.C. 154(b) by 151 days.

(21) Appl. No.: 11/344,824

(22) Filed: Feb. 1, 2006

(30) Foreign Application Priority Data

Feb. 3, 2005 (DE) ........................ 10 2005 006 726

(51) Int. Cl.
*G01B 11/26* (2006.01)

(52) U.S. Cl. .................................................. 356/139.04

(58) Field of Classification Search ............ 356/139.04, 356/3.01–3.15, 4.01–4.1, 5.01–5.15, 6–22, 356/28, 28.5, 139.01–139.1
See application file for complete search history.

(56) References Cited

U.S. PATENT DOCUMENTS

| | | | |
|---|---|---|---|
| 4,112,300 A | 9/1978 | Hall, Jr. et al. | |
| 4,926,050 A * | 5/1990 | Shemwell | 250/559.38 |
| 5,528,418 A | 6/1996 | Bowman, Jr. | |
| 5,793,034 A | 8/1998 | Wesolowicz et al. | |
| 6,057,915 A | 5/2000 | Squire et al. | |
| 6,483,106 B1 * | 11/2002 | Ohtomo et al. | 250/236 |
| 6,603,134 B1 | 8/2003 | Wild et al. | |

FOREIGN PATENT DOCUMENTS

| | | |
|---|---|---|
| DE | 44 12 044 A1 | 10/1995 |
| EP | 0 614 103 A1 | 9/1994 |
| FR | 2 736 731 | 1/1997 |
| WO | WO 03/102626 A1 | 12/2003 |
| WO | 2006/045271 A1 | 5/2006 |

\* cited by examiner

*Primary Examiner*—Thomas H. Tarcza
*Assistant Examiner*—Luke D Ratcliffe
(74) *Attorney, Agent, or Firm*—Harness, Dickey & Pierce, P.L.C.

(57) ABSTRACT

A method and an apparatus are used for detecting optical systems, for example a sniper within a terrain. The terrain is optically scanned by means of a movable mirror and the position of the optical system is determined from a measurement made by a laser unit and is optically displayed. The position of the optical system is directly determined from the measurement made by the laser unit by evaluating the intensity of a light beam from the laser unit, after having been reflected by an optical surface of the optical system. The position is optically reflected into the field of vision of a telescope. The apparatus comprises a laser unit having a movable mirror, a control unit for detecting the position of the optical system from a measurement made by the laser unit, and a device for optically displaying the position. The device for optically displaying is a telescope, and means are provided for optically reflecting the position of the optical system into the field of vision of the telescope.

30 Claims, 3 Drawing Sheets

APPARATUS AND METHOD FOR DETECTING OPTICAL SYSTEMS IN A TERRAIN

FIELD OF THE INVENTION

The invention, generally, is related to the field of military weapons.

More specifically, the invention is related to the field of methods and apparatuses for assisting the aiming at a hostile object with a weapon for launching low-velocity projectiles, in particular with a grenade launcher.

Still more specifically, the invention is related to a method for detecting optical systems within a terrain, wherein the terrain is optically scanned by means of a movable mirror, the position of the optical system being determined from a measurement made by a laser unit and being optically displayed.

The invention, moreover, is related to an apparatus for detecting optical systems within a terrain comprising a laser unit having a movable mirror, a control unit for detecting the position of the optical system from a measurement made by the laser unit, and a device for optically displaying the position.

BACKGROUND OF THE INVENTION

In the course of military conflicts, armed forces are increasingly challenged by hostile optical systems, in particular during non-conventional warfare which happens more and more often. The term "optical systems" in the meaning of the present invention shall designate systems that may be optically localized, for example hostile detection and aiming systems, and, above all, gunners, in particular snipers. There is a need for systems that allow to detect, localize and, as the case may be, also aim fire at such hostile optical systems or snipers, respectively.

U.S. Pat. No. 6,057,915 discloses an apparatus of the type specified at the outset which operates in two steps. In a first step, an area in a terrain is scanned by swiveling a mirror and by feeding the received light signals to a two-dimensional array being sensitive to infrared radiation. The array detects the firing of a projectile fired by a gunner on the basis of the heat dissipated by the projectile, and, thereupon, initiates the second step in such a situation. In the second step the trajectory of the projectile is followed by means of a laser radar via the swiveling of a mirror and, from the trajectory, the location is computed from which the projectile was fired, corresponding to the position of the gunner. The covered image of the aiming area is displayed on a screen of a personal computer.

This prior art system, therefore, has the disadvantage that the gunner must have fired at least one projectile, before he may be localized. Further, the apparatus is not handy and, due to all its components, may be used only as a stationary installation.

On the other hand, apparatuses are commercially available in which a large-area illumination of an aiming scene takes place by means of laser light with a concurrent observation of the illuminated aiming scene through a CCD-camera.

These apparatuses allow a passive observation of a terrain area and permit to detect, for example, laser light that is reflected from an aiming telescope of a gunner. However, these systems have a considerable weight of more than 30 kg and have a high energy consumption in excess of 200 W, so that such systems in practice may only be used stationary and only for short periods of time, given the high energy consumption, unless corresponding big and heavy energy sources are used.

International patent application disclosure document WO 03/102626 A discloses an apparatus for detecting optical and opto-electronic objects. The apparatus uses a laser light source having a one-dimensionally enlarged light exit in a vertical direction, and being directed onto an aiming area. A row of detectors being arranged vertically one above the other receives the light reflected from the aiming area. Further, a telescope-like optical observation system is provided.

This system, too, has the disadvantage that it is very heavy and not easy to operate.

U.S. Pat. No. 6,603,134 discloses an apparatus for military applications, which is intended to detect the presence of an enemy by optical means, and for neutralizing the enemy thereafter. Primarily, the apparatus is intended to destroy or at least render inoperable infrared measuring installations of an enemy by using correspondingly strong laser beams. The apparatus is intended to attack hostile objects, for example a hostile satellite which spies the home country, or which may likewise be a human or an animal eye. The object is defined as a retroreflector. The light beams emitted by an optical detection installation of the apparatus are retroreflected by the object and impinge as reflected light beams on a detector. For scanning a terrain area, the apparatus is swiveled by means of a scanning installation. Within the apparatus, the signal received by the detector and processed thereafter is fed to a so-called utilization system. This system controls the scanning installation, in order to follow a moving object. However, it may also be used to control a high energy laser gun which neutralizes the aimed object by means of a high energy laser beam. The apparatus does not provide a processing or a display of an image.

U.S. Pat. No. 4,112,300 discloses an apparatus for jamming or for destroying a hostile infrared installation. Within the apparatus an image of a hostile object is reflected into the field of vision of a telescope by processing the incoming light.

From general measuring technology so-called 2D- or 3D-scanners are known for measuring or surveying large rooms, tunnels or the like. These scanners use a laser beam which is emitted into a plane by means of a periodically swiveled or a rotating mirror. The light reflected from the illuminated environment is fed to a detector via the same mirror. Such a 3D-scanner is disclosed in German patent application disclosure document DE 44 12 044 A1.

SUMMARY OF THE INVENTION

It is, therefore, an object underlying the invention, to further improve a method and an apparatus of the type specified at the outset, such that the afore-mentioned disadvantages are avoided. In particular, a method and an apparatus shall be provided, which, by means of a compact and lightweight instrument, permits to localize an optical system, in particular a gunner, prior to the firing of a projectile, wherein the instrument preferably displays the position of the optical system or of the gunner, respectively, in a conventional telescope.

According to a method specified at the outset, this object is achieved in that the position of the optical system is directly determined from the measurement made by the laser unit by evaluating the intensity of a light beam from the laser unit, after having been reflected by an optical surface of the optical system, the position being optically reflected into the field of vision of a telescope.

According to the apparatus mentioned at the outset, this object is achieved in that the control unit determines the position of the optical system directly from the measurement made by the laser unit by evaluating the intensity of a light beam from the laser unit, after having been reflected by an optical surface of the optical system, that the device for optically displaying is a telescope, and that means are provided for optically reflecting the position of the optical system into the field of vision of the telescope.

The object underlying the invention is thus entirely solved.

By using a laser unit it becomes possible to scan with low energy consumption the terrain area under examination with respect to the presence of optical systems, because in contrast to a one- or two-dimensional illumination there is only a point-shaped laser beam that must be guided over the terrain area. This requires a faster signal processing, however, the components and circuits needed therefore are available today with low energy consumption. The reflection of the measuring results into the field of vision of a telescope has the advantage that the measuring result is immediately available within a conventional lightweight and portable observation instrument, i.e. together with an image of terrain area. The determined position of the optical system, therefore, is immediately available within the image of the terrain area. The term "telescope" is to be understood to comprise lightweight optical observation instruments of all kinds, i.e. also periscopes, cameras and the like.

Insofar, it is particularly preferred when the telescope is configured as an aiming telescope.

This measure has the advantage that the optical system, in particular a detected sniper, may immediately be aimed at and, as the case may be, be also fired at, after the determination of its position.

In a preferred further embodiment of the inventive method, the mirror is swiveled, or in an embodiment of the inventive apparatus, respectively, the mirror is an oscillating mirror adapted to be swiveled about an oscillation axis by means of an oscillation drive. The oscillation drive, more preferably, is configured as a torque motor. Moreover, it is preferred when the mirror is oscillated with a frequency corresponding to the resonance frequency of the system consisting of the oscillation drive together with the mirror.

This measure has the advantage that the relatively small range of elevation which is required for the purposes of the present invention may be simply run through. In contrast, for the rotation of the mirror a rotation about 360° would take place, although in the present context only angles of e.g. 6° to 10° are required. The utilization of a torque motor as an oscillation drive has the advantage that simple components which are commercially available, may be used for effecting a fast and exactly controlled swiveling movement of the mirror. The setting of the swiveling frequency to be equal to the value of the resonance frequency of the oscillatory system has the advantage that the swiveling movement of the mirror may be effected with the lowest possible energy consumption. This is of particular importance for portable units having a battery powered supply.

In the context of the inventive method it is particularly preferred when the mirror is swiveled about a horizontal axis by means of the oscillation drive, and the laser unit together with the telescope is manually swiveled into a horizontal plane.

This measure has the advantage that the terrain area to be scanned may be quickly and easily checked when the user of the system effects a corresponding horizontal sweep.

In the inventive apparatus it is preferred when the oscillation axis is a horizontal axis in an operational position of the apparatus.

This measure, too, has the advantage that a terrain section may easily be scanned by means of a manually effected sweep.

In a preferred embodiment of the inventive apparatus, the laser unit is part of a detection unit, wherein the detection unit in one alternate embodiment is adapted to be mounted to the top of the telescope, whereas according to another alternate embodiment it is adapted to be mounted to the front of the telescope.

This measure has the advantage that the system may be mounted to the telescope in one movement, for example by plugging.

In a particularly preferred embodiment of the inventive apparatus, the laser unit comprises a light source, the light beam of which being directed along an optical axis onto the mirror by means of a first deviation mirror, and is directed therefrom onto the terrain, the light beam reflected by the optical system being directed via the mirror along the optical axis onto a photosensitive element.

This measure has the advantage that the emitted light beam as well as the received light beam are guided over the same mirror, such that a highly compact design is obtained which particularly permits to configure the apparatus as an attachment to be mounted to the top or to the front of the telescope.

Further, it is preferred when the light source is configured as a laser diode. As an alternative, the laser diode may generate a light beam of a wavelength within the near infrared range, preferably in the range of between 1,450 to 1,600 nm, in particular at about 1,500 nm, or may generate a light beam of a wavelength in the transition between the visible and the invisible range, preferably in the range of between 750 to 900 nm, particular of 800 nm. For the first alternative a InGaAs laser diode would be preferred, for the second alternative, a GaAs laser diode would be preferably used.

This measure has the advantage, that an eye-safe spectral range may be selected, depending on the particular action to be taken.

A particularly good effect is achieved insofar, when a cylinder lens is arranged downstream the light path of the laser diode.

This measure has the advantage that the conventionally elliptical cross-section of a light exit of a laser diode is converted into a circular cross-section.

It is, further, preferred when the photosensitive element is an InGaAs PIN diode (of wavelength 1,450 to 1,600 nm) or a Si diode (of wavelength 750 to 900 nm), respectively.

In another preferred embodiment of the inventive apparatus an optical filter is positioned upstream the optical path of the photosensitive element, the optical filter being tuned to the wavelength of the light emitted by the light source.

This measure has the advantage that through the reduction of the influence of stray light the signal-to-noise ratio is improved.

According to embodiments of the inventive apparatus the mirror is positioned within a converging section of the light path of the light beam emitted by the light source.

This measure has the advantage that a compact design is achieved. On the other hand, it is also possible to position the mirror in a parallel section of the light path.

According to another embodiment of the inventive apparatus the means comprise a further light source, the further light source directing a further light mean onto the mirror, the further light beam having a wavelength within the visible range, wherein the further light beam, after having been reflected by the mirror, is reflected into the field of vision of the telescope.

This measure has the advantage that an image display of the position of the optical system within the visible range is provided which, in a simple manner, may be reflected into the field of vision of the telescope.

Insofar, it is preferred when the further light beam is directed onto a side of the mirror, the side being opposite to the side on which the reflected light beam impinges.

This measure has the advantage that a particularly simple concept providing a display of the position, e.g. of the gunner, is achieved, and, concurrently, an effective decoupling of the measuring circuit from the display circuit is also obtained.

Insofar, it is preferred, when the mirror is swiveled about an oscillation axis.

Moreover, the further light beam is preferably reflected into the field of vision of the telescope from the front of the telescope through an objective lens.

The laser unit and the means, preferably, have the same focal length.

This measure has the advantage that the imaging scale is the same. When the system is correctly set, it is a 1:1 system. Accordingly, a target is always displayed at the correct location, independent from the relative adjustment between the measuring system and the telescope.

Further advantages will be become apparent from the description and the enclosed drawing.

It goes without saying that the features mentioned before and those that will be explained hereinafter, may not only be used in the particularly given combination, but also in other combinations, or alone, without leaving the scope of the present invention.

BRIEF DESCRIPTION OF THE DRAWINGS

Embodiments of the invention are shown in the drawing and will be described in further detail throughout the subsequent description.

DETAILED DESCRIPTION OF THE PREFERRED EMBODIMENTS

Figure 1:
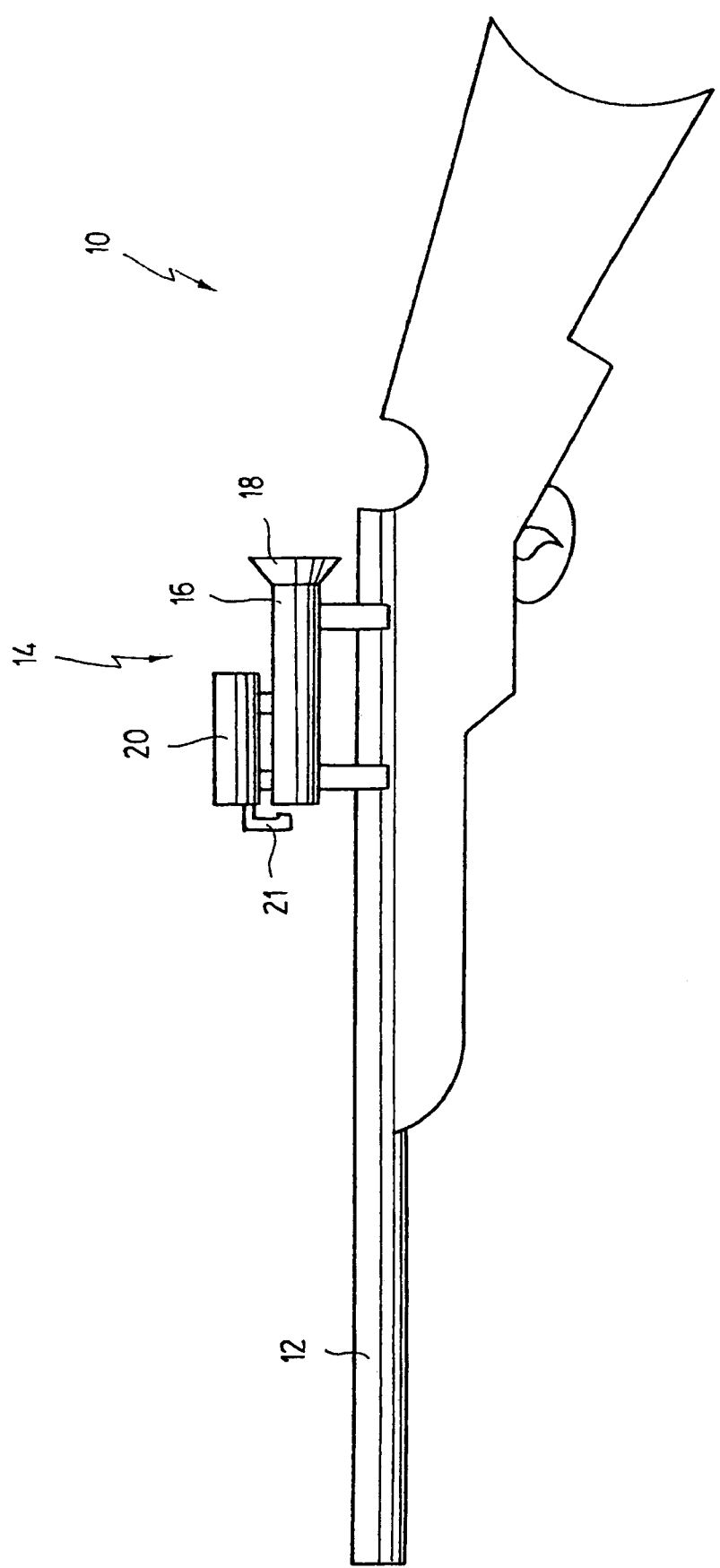
FIG. 1 shows a schematic side elevational view of a portable fire arm having an aiming telescope being equipped with an embodiment of an inventive apparatus.

In FIG. 1, reference numeral 10 as a whole designates a portable firearm, in the embodiment shown, a rifle. It goes without saying that the invention is not limited to this kind of weapons. In particular, the invention may likewise be used in connection with other weapons, for example may be used with mobile launching installations for low-velocity projectiles, grenade launchers, for example.

A sighting unit designated at 14 is mounted on a gun barrel 12 of portable firearm 10. Sighting unit 14 consists of an aiming telescope 16 having an eye piece 18. A detection unit 20 is mounted from above an aiming telescope 16, for example by plugging. Detection unit 20 comprises a unit for reflecting an image into the field of vision of aiming telescope 16. Unit 21 reflects light signals from the front into aiming telescope 16.

Detection unit 20 is used for detecting optical systems within a terrain. The term "optical system" is to be understood in the context of the present application to comprise optically localizable systems, for example hostile searching or aiming systems, and further, above all, also gunners, in particular snipers.

If in the course of a military action a user of portable firearm 10 approaches the terrain in which the presence of hostile snipers is suspected, he will first plug detection unit 20 onto aiming telescope 16. He then observes the terrain in question by means of aiming telescope 16 by slowly sweeping portable fire arm 10 together with aiming telescope 16 laterally over the terrain. Detection unit 20 examines the terrain and images the position of a sniper into the image of aiming telescope 16, as soon as such a sniper has been detected and localized.

It goes without saying that detection unit 20 may not only be used in connection with an aiming telescope 16. Instead, it may also be used in connection with other optical observation instruments, for example telescopes, periscopes, cameras, and the like. If, therefore, in the context of the present invention the term "telescope" is used, this shall also comprise such other optical observation instruments.

Figure 2:
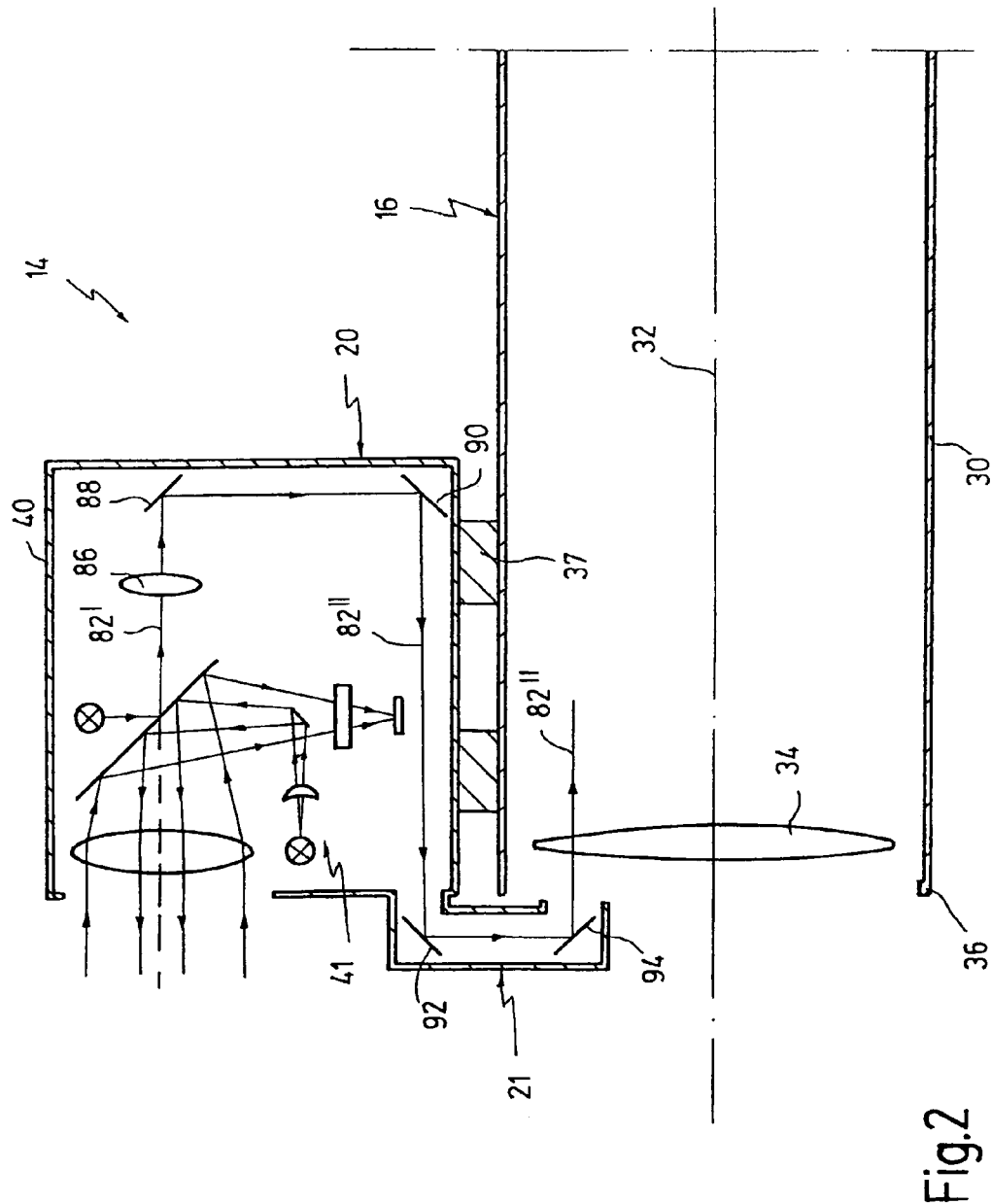
FIG. 2 on an enlarged scale schematically shows a side elevational view of a first embodiment of an inventive apparatus.
Figure 3:
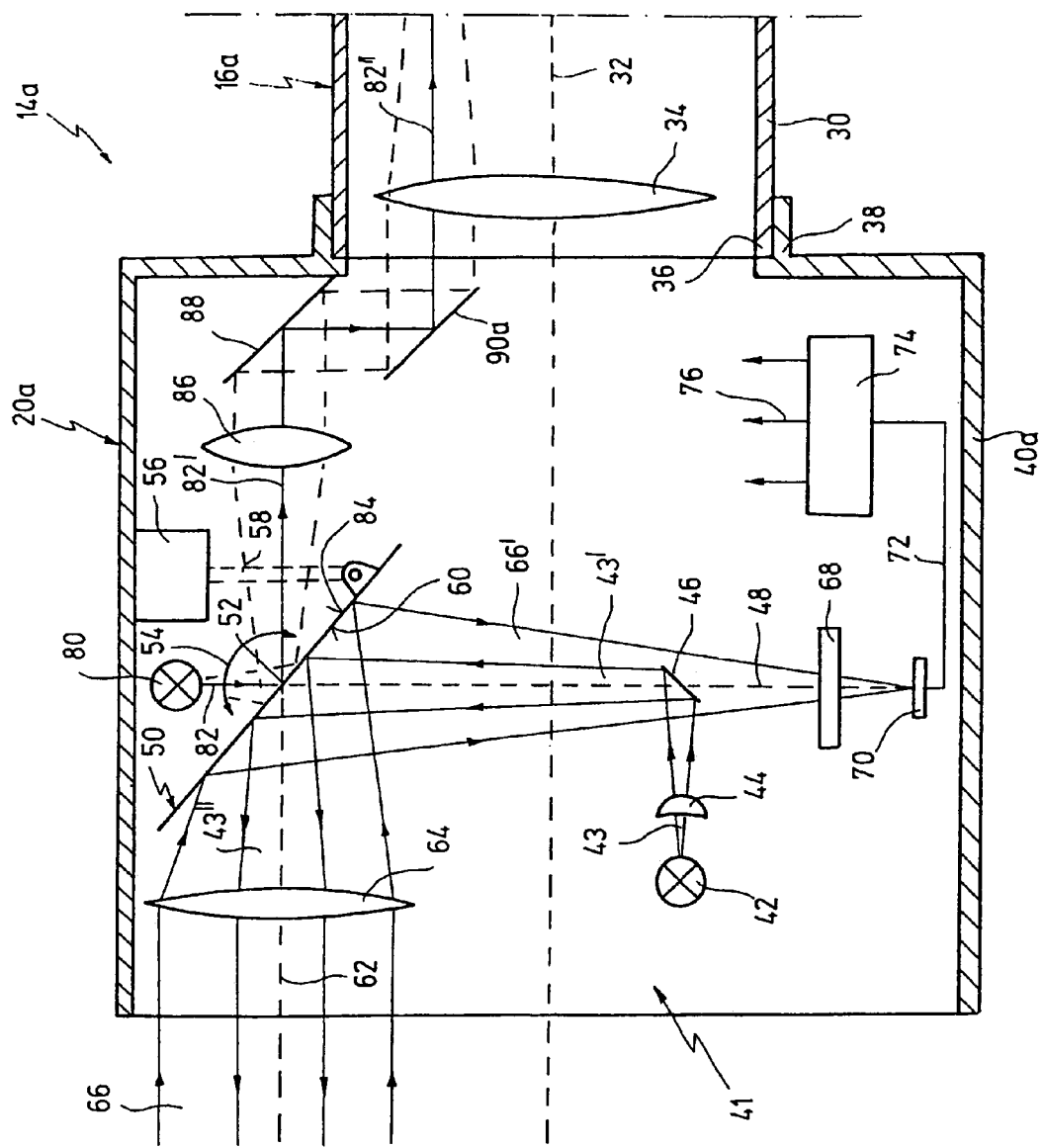
FIG. 3 is an illustration, similar to that of FIG. 2, however, with further details and for the slightly modified second embodiment of an inventive apparatus.

FIGS. 2 and 3 show details of detection unit 20. The difference between the embodiments shown in FIGS. 2 and 3 only consists in that in the embodiment of FIG. 2 detection unit 20, as already shown in FIG. 1, is mounted from above on aiming telescope 16, whereas in the embodiment of FIG. 3 detection unit 20a is attached to aiming telescope 16a from the front. For that reason FIGS. 2 and 3 use like numerals for like elements, however, in FIG. 3 an "a" is added to the numerals for modified elements. The illustration of details in FIG. 3 is somewhat more detailed, such that both figures are referred to below, unless otherwise stated.

At its front end, aiming telescope 16 terminates in a telescope barrel 30 and has a first optical axis 32. Telescope barrel 30 at its front end 36 encloses an objective lens 34 of aiming telescope 16.

FIG. 2 shows that in the area of front end 36 there are connector elements on the upper side thereof, for mounting or plugging thereon to a sighting barrel 40 of detection unit 20.

In the embodiment of FIG. 3, there is a connecting muff 38 of sighting barrel 40a of detection unit 20a mounted onto front end 36 or plugged thereon.

Detection unit 20 and 20a, respectively, may, therefore, be simply attached to aiming telescope 16 from above or from the front.

Barrels 40 and 40a, respectively, of detection unit 20 and 20a, respectively, enclose a light source 42. Light source 42, preferably, is a laser diode. The laser diode, in a first alternative of this embodiment may operate in the so-called "eye-safe" spectral range, for example at a wavelength in the range of between 1,450 to 1,600 nm, preferably of about 1,500 nm, i.e. in the near infrared range. The laser diode in that situation is, preferably, an InGaAs laser diode. In a second alternative, however, one may operate within the transition from the visible to invisible spectral range, i.e. at a wavelength in the range of between 750 to 900 nm, preferably at about 800 nm. In that situation, preferably, a GaAs laser diode is used.

Light source 42 generates an emitted light beam 43, preferably in a direction parallel to first optical axis 32, when in a normal operational position. Considering that conventional laser diodes have an oval illumination spot, there is a cylinder lens 44 arranged downstream the optical path of the laser diode, for transforming the oval illumination spot into a circular shape. This circular shape light beam now impinges on a deviation mirror 46 which deviates the light beam by, preferably, about 90°, i.e. in FIGS. 2 and 3 upwardly along a second optical axis 48.

The deviated emitted light beam 43' now impinges on an oscillating mirror 50. Oscillating mirror 50 is positioned in the upper area of sighting barrel 40. Oscillating mirror 50 is adapted to be swiveled about an oscillation axis 52, as indicated by a double arrow 54. Oscillation axis 52 extends perpendicular to the plane of FIG. 2, i.e. in a horizontal direction when in a normal operational position. For swiveling oscillating mirror 50 an oscillation drive 56 is provided which is only very schematically shown in FIG. 3. Oscillation drive 56 is connected to oscillating mirror 50 via an actuating connection 58. Oscillating mirror 50 is swiveled periodically about an angle of e.g. 5° to 20° and at a frequency of e.g. 100 Hz.

Oscillation drive 56, preferably, is configured as a torque motor. Oscillation drive 56, further, is preferably operated at a frequency, corresponding to the resonance frequency of the system configured by oscillation drive 56 and oscillating mirror 50. The resonance property of this system may be optimized by springs or the like.

In the illustration of FIG. 2, emitted light beam 43' impinges form below on a front side of oscillating mirror 50 and is deviated along a third optical axis 62 extending essentially parallel to first optical axis 32 when oscillating mirror 50 is in its middle position. Emitted light beam 43", twice deviated, now runs through a collimator lens, such that it exits from the front end of detection unit 20 as a parallel light beam.

In FIG. 3 reference numeral 65 with the symbol of a triple mirror indicates a sniper who is located in the terrain area on which detection unit 20a is directed. The reflecting element may, in a more general approach, be an optical system having an image plane or an intermediate image plane in which a plane optical surface is located which acts as a retroreflector. This may, for example, be an aiming telescope of sniper 65 having an intermediate image plane where a reticle is applied to a plane parallel glass plate. However, the reflecting element may likewise be an eye of sniper 65.

A received light beam 66 reflected from sniper 65 enters detection unit 20 from the front end thereof along third optical axis 62. Received light beam 66 there impinges on front side 60 of oscillating mirror 50 and is deflected in an opposite direction along the path of emitted light beam 43, i.e. along second optical axis 48 downwardly. Deviated received light beam 66' then runs on this path through an interference filter 68 being tuned to its wavelength. Finally, it impinges on a photosensitive element 70. Photosensitive element 70, preferably, is a InGaAs PIN diode (wavelength 1,450 to 1,600 nm) or a Si diode (wavelength 750 to 900 nm), respectively.

Photosensitive element 70 is connected to a control unit 74 via an electrical line. Control unit 74 comprises a comparator, the threshold value of which is set such that a distinction between "normal" reflected light and a more intensive light reflected from sniper 65 may be made. Control unit 74 is provided with a plurality of outputs, interconnecting control unit 74, for example, with oscillation drive 56, in particular, however, with a further light source 80.

Further light source 80, preferably, is likewise a laser diode, which, however, must operate within the visible spectral range, for example within the green range, i.e. around 530 nm wavelength. Further light source 80 is activated by control unit 74, if photosensitive element 70 has detected a received light beam 66 being above the threshold value. This happens so quickly that mirror 50 in that instance is practically still in the same angular position, as it had been at the moment in time when this threshold value was detected.

Further light source 80 emits a visible light beam 82 on a reflecting rear side 84 of oscillating mirror 50. Light beam 82, therefore, is deviated into a direction along third optical axis 62. Deviated light beam 82' then runs through a collimator objective lens 86.

In the embodiment of FIG. 2, light beam 82' is then deviated four times, each time about 90°, by means of deviation mirrors 88, 90, 92 and 94. Then it runs parallel to third optical axis 62 and, hence, also parallel to first optical axis 32. Deviation mirrors 92 and 94 are located within unit 21, the output of which (deviation mirror 94) being directed from the front end into aiming telescope 16 and on the objective lens 34 thereof.

In the embodiment of FIG. 3, however, light beam 82 is only deviated twice, each time about 90°, by means of deviation mirrors 88 and 90a. It then extends likewise parallel to third optical axis 62 and, hence, also parallel to first optical axis 32.

In both cases light beam 82" impinges from the front end into objective lens 34 of aiming telescope 16. Thereby, the detected position of sniper 65 appears as an image spot within the image of aiming telescope 16, such that the user of the portable firearm 10 needs only to direct the firearm towards the detected position, so that the sniper may be fired at, as the case may be.

The focal length of the emitting/receiving optic on the one hand and of the collimator objective lens 86 on the other hand, are selected to be equal. When the system is adjusted correctly, it, thereby, configures a so-called 1:1 system and displays targets always at the exact location, irrespective of the relative adjustment between detection unit 20 and the aiming and observation system.

The invention claimed is:

1. A method for detecting optical systems within a terrain using a portable sighting apparatus that is positioned relative to a telescope through which the terrain is viewed by a user, wherein said terrain is optically scanned by means of a movable mirror, a position of said optical system being determined from a measurement made by a laser unit, wherein said position of said optical system is directly determined from said measurement made by said laser unit by evaluating an intensity of a light beam from said laser unit after having been reflected by an optical surface of said optical system, said position being optically reflected into a field of vision of a telescope from a front end thereof, so as to appear through the telescope within the view of the user.

2. The method of claim 1, wherein an aiming telescope is used as said telescope.

3. The method of claim 1, wherein said mirror is swiveled.

4. The method of claim 3, wherein said mirror is swiveled about an oscillation axis by means of an oscillating drive, said laser unit together with said telescope being manually swiveled within a horizontal plane.

5. The method of claim 4, wherein said mirror is oscillated with a frequency corresponding to a resonance frequency of a system consisting of said oscillation drive together with said mirror.

6. A portable sighting apparatus for detecting optical systems within a terrain comprising a laser unit having a movable mirror, a control unit for detecting a position of said optical system from a measurement made by said laser unit, and a device for optically displaying said position, wherein said control unit determines said position of said optical system directly from said measurement made by said laser unit by evaluating said intensity of a light beam from said laser unit after having been reflected by an optical surface of said optical system, said device for optically displaying being a telescope that is positioned relative to the laser unit, and means for optically reflecting said position of said optical system into a field of vision of said telescope from a front end thereof so as to appear within the view of a user viewing the terrain through said telescope.

7. The apparatus of claim 6, wherein said telescope is configured as an aiming telescope.

8. The apparatus of claim 6, wherein said laser unit is part of a detection unit, said detection unit being adapted to be mounted to a top of said telescope.

9. The apparatus of claim 6, wherein said laser unit is part of a detection unit, said detection unit being adapted to be mounted to a front of said telescope.

10. The apparatus of claim 6, wherein said mirror is an oscillating mirror adapted to be oscillated about an oscillation axis by means of an oscillation drive.

11. The apparatus of claim 10, wherein said oscillation drive is configured as a torque motor.

12. The apparatus of claim 10, wherein said oscillation drive together with said oscillating mirror constitute an oscillatory system, said oscillation drive being operated at a resonant frequency of said oscillatory system.

13. The apparatus of claim 10, wherein said oscillation axis is a horizontal axis in an operational position of said apparatus.

14. The apparatus of claim 6, wherein said laser unit comprises a light source, a light beam of which being directed along an optical axis onto said mirror by means of a first deviation mirror, and being directed therefrom onto said terrain, said light beam, after having been reflected by said optical system, being directed via said mirror along said optical axis onto a photosensitive element.

15. The apparatus of claim 14, wherein said light source is configured as a laser diode.

16. The apparatus of claim 15, wherein said laser diode emits a light beam at a wave length in the near infrared range, preferably in a range of between 1,450 to 1,600 nm.

17. The apparatus of claim 16, wherein said laser diode is configured as a InGaAs laser diode.

18. The apparatus of claim 15, wherein said laser diode emits a light beam at a wave length in a transition from the visible to the invisible range, preferably in a range of between 750 to 900 nm.

19. The apparatus of claim 18, wherein said laser diode is configured as a GaAs laser diode.

20. The apparatus of claim 15, wherein a cylinder lens is arranged downstream a light path of said laser diode.

21. The apparatus of claim 16, wherein said photosensitive element is a InGaAs PIN diode.

22. The apparatus of claim 18, wherein said photosensitive element is a Si diode.

23. The apparatus of claim 14, wherein an optical filter is positioned upstream said optical path of said photosensitive element, said optical filter being tuned to the wave length of said light emitted by said light source.

24. The apparatus of claim 14, wherein said mirror is positioned within a converging section of said light path of said light beam emitted by said light source.

25. The apparatus of claim 6, wherein said means comprise a further light source, said further light source directing a further light beam onto said mirror, said further light beam having a wave length within the visible range, said further light beam, after having been reflected by said mirror, being reflected into said field of vision of said telescope.

26. The apparatus of claim 25, wherein said further light beam is directed onto a first side of said mirror, said first side being opposite to a second side on which said reflected light beam impinges.

27. The apparatus of claim 24, wherein said further light beam is reflected into said field of vision of said telescope from a front of said telescope through an objective lens.

28. The apparatus of claim 6, wherein said laser unit and said means have the same focal length.

29. The apparatus of claim 16, wherein said laser beam has a wave length of 1,500 nm.

30. The apparatus of claim 18, wherein said laser beam has a wave length of 800 nm.

* * * * *